March 1, 1966   L. Q. DE PUY   3,237,793
HOSE GUIDE FOR FRONT END LOADERS AND THE LIKE
Filed July 8, 1964
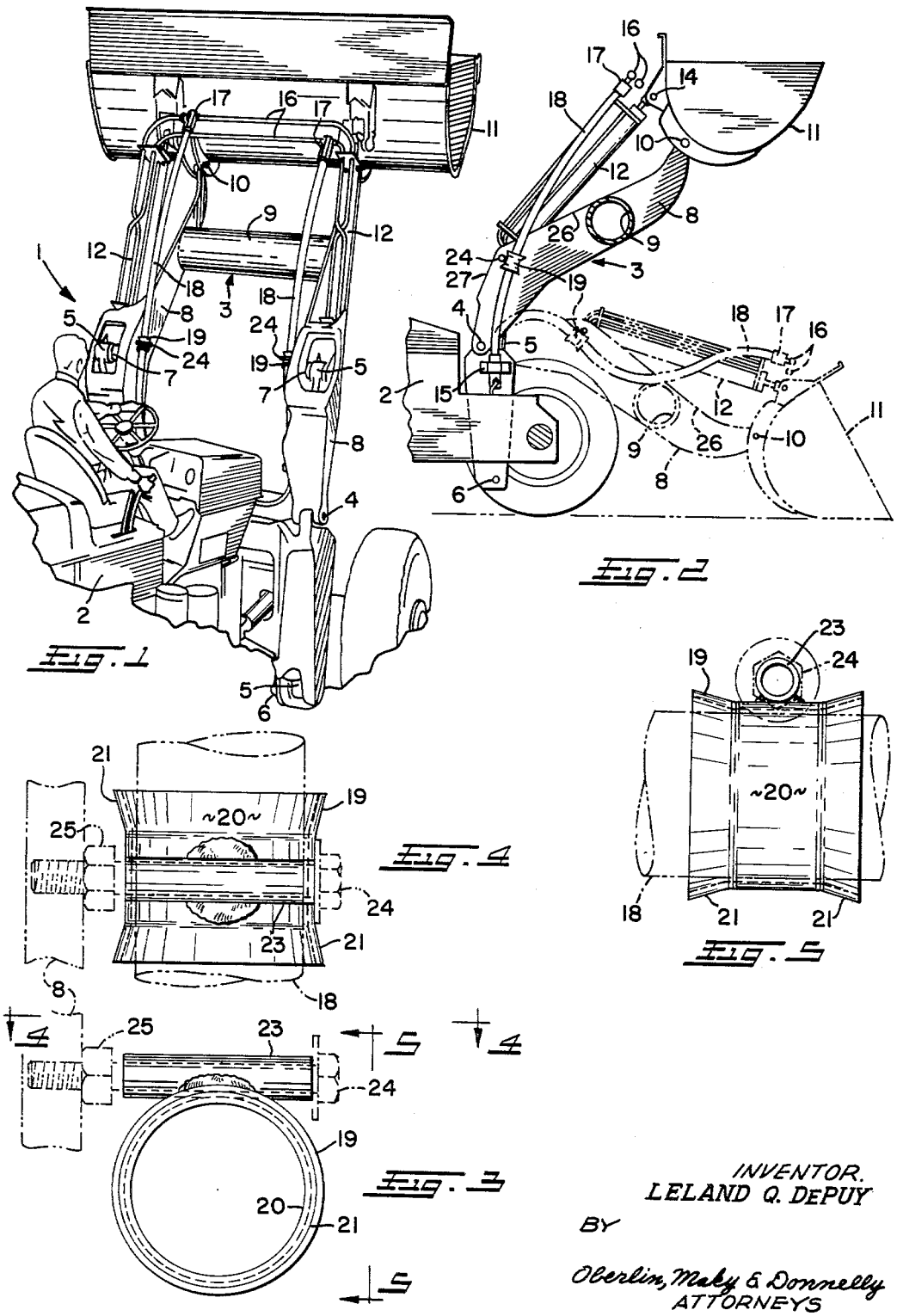
INVENTOR.
LELAND Q. DePUY
BY
Oberlin, Maky & Donnelly
ATTORNEYS

United States Patent Office 3,237,793
Patented Mar. 1, 1966

3,237,793
HOSE GUIDE FOR FRONT END LOADERS AND THE LIKE
Leland Q. De Puy, Cleveland, Ohio, assignor to Parker-Hannifin Corporation, Cleveland, Ohio, a corporation of Ohio
Filed July 8, 1964, Ser. No. 381,048
6 Claims. (Cl. 214—140)

The present invention relates generally as indicated to a hose guide for front end loaders and the like.

In the case of front end loaders and other hydraulically actuated equipment, including machine tools, there are instances where the ends of a flexible hose move relatively toward or away from each other and thus there will be varying degrees of slack in the hose. Specifically, a front end loader of the type which comprises a boom arm and bucket assembly pivotally mounted at its rear end to the tractor, usually has flexible hoses extending from the tractor to the bucket control cylinders, the connections of said hoses being eccentrically disposed relative to the boom-tractor pivot whereby, as the boom is swung up and down, the distances and the angular positions of the hose end connections of the respective hoses change with respect to each other. Accordingly, when such bucket control hoses are in their most slack positions they are prone to being caught, kinked, or damaged with attendant danger of the operator or other persons being sprayed with hot oil.

It is, therefore, a principal object of this invention to provide hose guides for the respective bucket control hoses through which intermediate portions of said hoses extend so as to be retained thereby from such dangling, said hose guides being mounted on the forwardly extending boom arms.

It is another object of this invention to provide hose guides of the character indicated which are swivelly mounted on the boom arms so as to assume various angular positions as the front end loader boom is raised and lowered.

It is another object of this invention to provide hose guides of the character indicated which have flared ends to preclude sharp bending of the hoses as they relatively longitudinally slide through said guides.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a fragmentary perspective view showing a front end loader having hose guides according to the present invention installed on the inside faces of the boom arms thus to guide and retain the respective hoses for the bucket control cylinders;

FIG. 2 is a vertical cross-section through the boom assembly in its raised position and showing in dot dash lines the lowered position of the boom wherein the hose guide herein has swiveled to accommodate the added slack in the flexible hose passing therethrough;

FIG. 3 is an end elevation view of the hose guide herein;

FIG. 4 is a top plan view as viewed along the line 4—4, FIG. 3; and

FIG. 5 is a side elevation view as viewed along the line 5—5, FIG. 3.

Referring to FIGS. 1 and 2, the front end loader 1 with which the present invention has been illustrated comprises a tractor 2 having the rear end of the boom assembly 3 pivotally connected thereto at 4 for movement between the solid line and dotted line positions (FIG. 2) by means of a pair of boom hoist cylinders 5 pivotally connected to the tractor 2 at 6, and to the boom arms at 7. The boom arms 8 are securely joined together adjacent their front ends by the tubular cross member 9, and pivotally connected to the front ends of said boom arms 8 at 10 is a scoop or bucket 11, said bucket 11 being actuated by hydraulic cylinders 12 pivotally connected to the respective boom arms adjacent pivots 7 and to the bucket 10 at 14.

As evident in FIG. 2, the bucket 11 in its dot dash position is in digging position and, when the bucket tilt cylinders 12 are retracted, the bucket 11 will be tilted backward to load-holding position and, when the boom assembly 3 is raised to the solid line position of FIG. 2, the load in the bucket 11 will be lifted. By extending the bucket tilt cylinders 12 the load in the bucket 11 may be dumped, as into a truck or the like.

In the present case, the tractor 2 has mounted thereon couplings 15 disposed below and forwardly of the boom pivots 4, said couplings 15 having fluid communication with the respective service ports of a four-way bucket tilt control valve (not shown).

Connected across the rod end of the cylinders 12 are a pair of rigid pipes 16; 16 equipped with T fittings 17; 17 to which the respective flexible hoses 18; 18 from the respective tractor fittings 15 are connected. As well known in the art, when it is desired to extend (or retract) the bucket tilt cylinders 12, oil under pressure will be delivered through one hose 18 for communication with the pipe 16 that leads to the head end (or rod end) of said cylinders 12 while the displaced fluid from the rod end (or head end) of the cylinders 12 will be conducted to an oil reservoir in the tractor 2 via the other pipe 16 and the other hose 18.

When the boom and bucket assembly 3 is in its lowered position, as shown in dot dash lines in FIG. 2, the T's 17 of the rigid piping 16; 16 will be closer to the tractor fittings 15; 15 than when the boom assembly is in its raised solid line position, and thus in said lowered position, there will be considerable slack in the hoses 18, 18 and unless held or guided, they are apt to dangle and become tangled or caught. Accordingly, on the inside of each boom arm 8 is mounted a hose guide 19.

As best shown in FIGS. 3, 4, and 5, the hose guide 19 itself comprises a tubular sleeve 20 which has an inside diameter slightly greater that of the hose 18 passing therethrough, and which has outwardly flared end portions 21 to preclude sharp bending of the hose. Brazed, or otherwise secured, transversely on one side of the sleeve 20 is a bushing 23 which extends at right angles to the axis of the sleeve 20. The bushing 23 is pivotally mounted on a bolt 24 extending therethrough and having threaded engagement in the associated boom arm 8, and a lock nut 25 is provided to lock the bolt against turning.

When the boom assembly 3 is in its lowered position, the hose guide 19 is in the position shown in dot dash lines with its axis disposed generally parallel to the side 26 of the boom arms 8, whereas, when the boom assembly 3 is in the raised position, said hose guide 19 has been swung about the pivot 24 so that its axis is approximately parallel with the side 27 of the boom and, of course, during the upward movement of the boom assembly 3 there is relative longitudinal movement of the hose 18 through the hose guide 19.

Accordingly, it can be seen that the pivotally mounted hose guides 19 herein guide and retain the flexible hoses 18 so that they will not be kinked or otherwise damaged.

While not shown herein, each hose 18 may have an armor wire or the like wrapped therearound.

Other modes of applying the principle of the invention may be employed, change being made as regards the details described, provided the features stated in any of the following claims, or the equivalent of such, be employed.

I therefore particularly point out and distinctly claim as my invention:

1. In combination, a front end loader including a frame, a boom pivotally mounted to said frame, a fluid pressure supply coupling eccentrically disposed with respect to the boom pivot, a control cylinder and coupling therefor attached to said boom for movement therewith, and a flexible hose extending from said supply coupling to said control cylinder coupling; and a hose guide on said boom through which an intermediate portion of said hose extends, thus to be retained as the amount of slack in said hose varies during raising and lowering of said boom, said hose guide being mounted on said boom for pivotal movement about an axis generally parallel to said boom pivot to accommodate change in relative angular positions of said couplings during raising and lowering of said boom.

2. In combination, a front end loader including a frame, a boom pivotally mounted to said frame, a fluid pressure supply coupling eccentrically disposed with respect to the boom pivot, a control cylinder and a coupling therefor attached to said boom for movement therewith, and a flexible hose extending from said supply coupling to said control cylinder coupling; and a hose guide on said boom comprising a tubular sleeve through which an intermediate portion of said hose extends for longitudinal movement during raising and lowering of said boom, said tubular sleeve being mounted on said boom for pivotal movement about an axis generally parallel to said boom pivot to accommodate change in relative angular positions of said couplings during raising and lowering of said boom.

3. The combination of claim 2 wherein said hose guide has flared ends for supporting said hose against sharp bending.

4. In combination, a front end loader including a frame, a boom pivotally mounted to said frame, a fluid pressure supply coupling eccentrically disposed with respect to the boom pivot, a control cylinder and coupling therefor attached to said boom for movement therewith, and a flexible hose extending from said supply coupling to said control cylinder coupling; and a hose guide on said boom through which an intermediate portion of said hose extends, thus to be retained as the amount of slack in said hose varies during raising and lowering of said boom, said hose guide comprising a first tubular member through which said hose extends, a second tubular member secured to said first tubular member in angular relation thereto, and bolt means engaged with said boom and extending through said second tubular member to constitute a pivot for said hose guide generally parallel to said boom pivot.

5. In combination, a hydraulically actuated apparatus including a frame, an element pivotally mounted to said frame, a fluid pressure supply coupling eccentrically disposed with respect to the element pivot, a control cylinder and coupling therefor operatively connected to said element for effecting pivotal movement thereof, and a flexible hose extending from said supply coupling to said cylinder coupling for conveying operating fluid to said cylinder; and a hose guide on said element through which an intermediate portion of said hose extends, thus to be retained as the amount of slack in said hose varies during pivoting movement of said element which causes movement of the ends of said hose toward and away from each other, said hose guide being mounted on said element for pivotal movement about an axis generally parallel to said element pivot to accommodate change in relative angular positions of said couplings during such pivoting movement of said element.

6. The combination of claim 5 wherein said hose guide comprises a first tubular member through which said hose extends, a second tubular member secured to said first tubular member in angular relation thereto, and bolt means engaged with said element and extending through said second tubular member to constitute a pivot for said hose guide generally parallel to said element pivot.

References Cited by the Examiner

UNITED STATES PATENTS

| | | | |
|---|---|---|---|
| 162,445 | 4/1875 | Wilcox. | |
| 740,328 | 9/1903 | Steel. | |
| 2,684,228 | 7/1954 | Dion | 254—190 X |
| 3,028,026 | 4/1962 | Palmberg | 214—140 |
| 3,048,369 | 8/1962 | Hanson | 254—190 X |
| 3,158,273 | 11/1964 | Brown | 214—140 |

HUGO O. SCHULZ, *Primary Examiner.*